Dec. 16, 1947.  J. A. SAMS  2,432,811
MAGNETIC TESTING DEVICE
Filed Oct. 14, 1944  2 Sheets-Sheet 1

Inventor:
James A. Sams,
by Harry E. Dunham
His Attorney.

Inventor:
James A. Sams,
by Harry E. Dunham
His Attorney.

Patented Dec. 16, 1947

2,432,811

UNITED STATES PATENT OFFICE 2,432,811

MAGNETIC TESTING DEVICE

James A. Sams, Schenectady, N. Y., assignor to General Electric Company, a corporation of New York Application October 14, 1944, Serial No. 558,691

5 Claims. (Cl. 175—183)

My invention relates to a portable metering device for measuring the magnetic flux existing in magnetic materials.

In industry, steel and other magnetic castings, forgings, plates and articles are frequently tested for small cracks, flaws, blowholes, and the like which are invisible or difficult to see, by magnetizing the piece in question and distributing powdered magnetic material on its surface. If a crack exists crosswise of the direction of the flux through the piece under test, the reluctance across the crack through the material is increased and the powdered magnetic material is attracted to the surfaces of the crack where the flux tends to be forced out of the material or around the crack, and the crack or other defect is thus revealed. The piece under test may be magnetized in various ways as by passing current through it, by placing a current-carrying coil about it, by magnetizing it with magnets provided for that purpose, by placing in a magnetic field, etc. Owing to the variety of sizes and shapes of pieces thus tested, various methods of magnetizing are employed. The degree of magnetization is quite important to obtain best results. If the piece is not sufficiently magnetized, poor results are obtained. A degree of magnetization approaching saturation is also undesirable not only because of poor results but also because of the waste of magnetizing energy and the added difficulty of cleaning the piece of the powdered magnetic material following a test. Also, different materials and tests require different degrees of magnetization. For instance, a test for subsurface defects requires a higher degree of magnetization than a test for surface cracks. When the magnetizing is alternating in character, it should be approximately double that of a unidirectional flux.

An important impediment to the use of this general method of magnetic testing has been the difficulty of obtaining and determining the optional degree of magnetization and while my metering device may be useful for other purposes, it is particularly designed as a simple, portable, and accurate meter for quickly determining when a test piece is properly magnetized for different magnetic tests of the character referred to above. The apparatus is adaptable for either unidirectional or alternating flux measurements.

Figure 1:
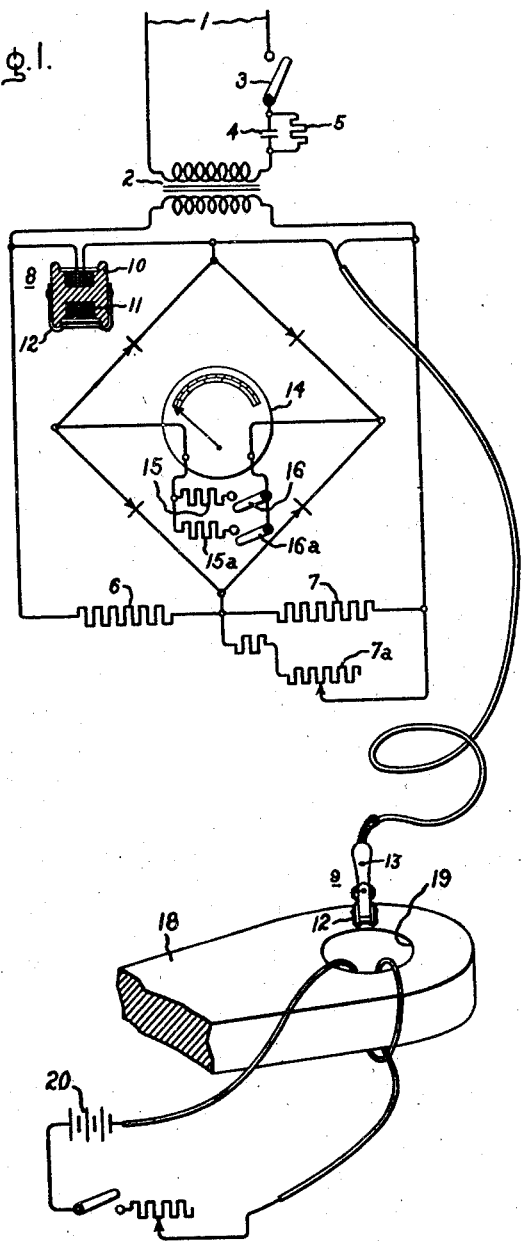
Figure 2:
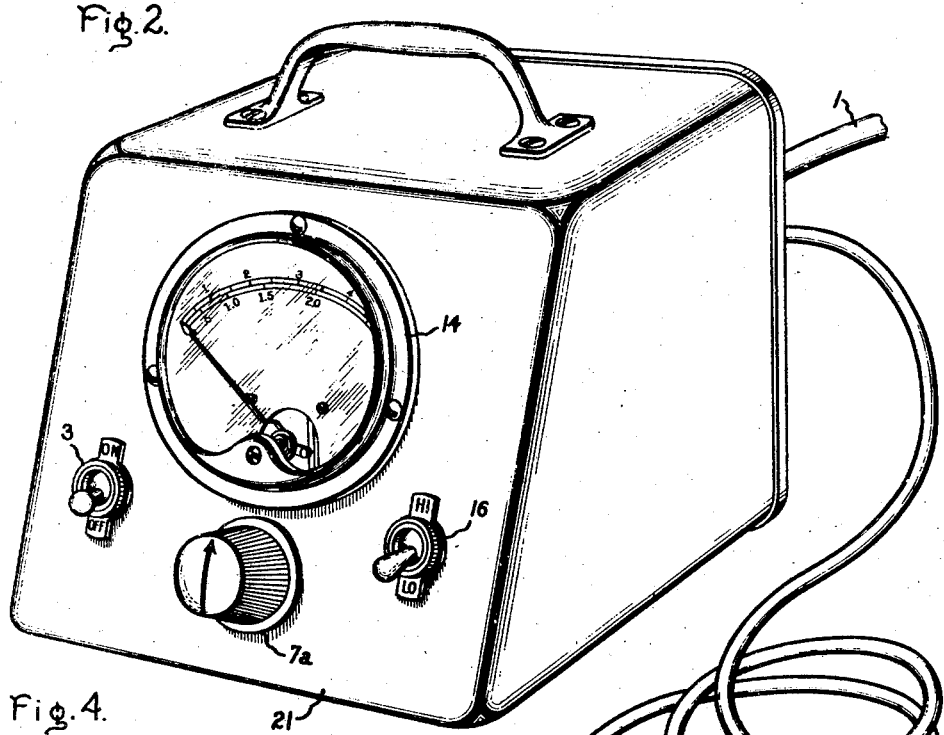
Figure 4:
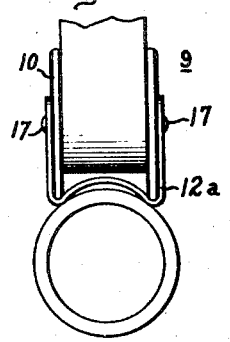
Figure 5:
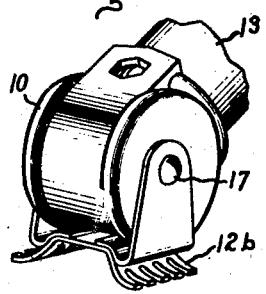
Figure 3:
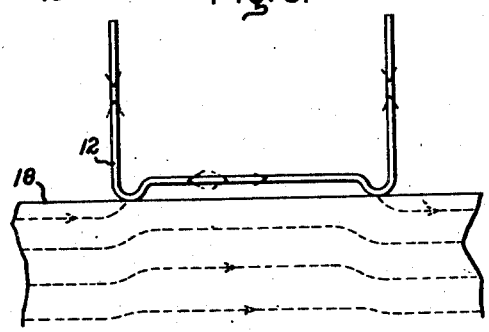

The features of my invention which are considered to be novel and patentable will be pointed out in the claims appended hereto. For a better understanding of my invention and its method of use, reference is made in the following description to the accompanying drawing in which Fig. 1 shows a circuit diagram for my electromagnetic gauge and the apparatus as used for testing the magnetized condition of a casting; Fig. 2 shows an enlarged external view of the testing gauge head and instrument used; Fig. 3 represents the manner of placing the gauge head on a piece under test; and Figs. 4 and 5 show modified forms of interchangeable flux shunts.

In Fig. 1 I have shown a bridge circuit supplied by alternating current from a source 1 through a transformer 2 which is issued only when the test piece is magnetized by unidirectional flux. There is a switch 3 in this supply circuit for opening the supply circuit when the apparatus is not being used. A condenser 4 shunted by a resistance 5 may be included in the supply circuit to improve the regulation. The bridge circuit shown comprises two resistance arms 6 and 7 and two reactance arms 8 and 9. The resistance 7 is shunted by an adjustable resistance 7a for purposes to be explained. The reactances 8 and 9 are electrically similar and equal and differ only in that reactance 9 is provided with a handle and flexible lead to facilitate its use as a testing head as will be explained. Reactance 8 is shown in cross section and an enlarged view of the reactance 9 with its handle is shown in Fig. 2. The reactances 8 and 9 each comprise a spool-shaped magnetic core 10 about which is wound a coil 11. Pivoted at the outer end center of the spools is a magnetic shunting shoe piece 12 of U-shape which extends between the ends of the spool outside the coils as represented. In the gauge head reactance 9 this shunting shoe 12 is positioned against the casting or other part to be tested, so that the spool ends are separated from such casting by the shunt when in testing position. The shoe 12 is adjustable around the center of the spool, so that it may be positioned as above described when the handle 13 is in any position convenient for testing purposes. The shunt 12 is of a high permeability material such as Nicaloy. Connected across the output diagonal of the bridge is a sensitive rectifier type direct current measuring instrument 14. A full wave rectifier mesh is used and the instrument preferably has two scales and one or more shunt resistors 15 and 15a which may be opened and closed as by switches 16 and 16a for changing the instrument ratio. One resistor 15a is used for alternating current magnetization tests and the other 15 is used for direct current magnetization tests. In either case a two-to-one ratio has been found desirable. Thus with the switch 16 closed the rectifier instrument combination ratio will be twice what it is with both switches open for direct current magnetization tests. An enlarged view of the instrument scales is shown in Fig. 2. The upper scale is used with the switch 16 or 16a closed. It has been found convenient, because of the way the apparatus is used, to employ an instrument with a suppressed zero. Hence, when the instrument is deenergized, the pointer thereof is offscale below the left or zero end thereof. The apparatus shown in Fig. 1 with the exception of the reactance test head 9 will preferably be contained in a portable case 21 with instrument 14 as is indicated in Fig. 2.

For general purpose testing the gauge head 9 may have the following dimensions: Length of core 10, ¾ inch; maximum end diameter of core, 1 inch; cross-sectional dimensions of shunt 12, ⅝ by 0.025 inch, coil, 900 turns of 0.0063 insulated wire having about 32 ohms resistance. The outer or contact surface of the shunt is preferably bent inwardly between its ends as shown, so that when placed on a piece to be tested, contact will be made at the ridges at the two ends of the shunt adjacent the ends of the spool core as represented in Fig. 3. Good magnetic contact between the shunt and periphery of the spool core ends should exist. The particular shape of the shunt shown has been found satisfactory for general application. Where tests are to be made on pieces having highly curved or specially shaped surfaces, shunts especially shaped for such surfaces may be used and the invention contemplates using shunts having contact surfaces shaped for the work at hand. Fig. 4 shows a shunt 12a shaped to test small pipes where the direction of flux in the test piece is circumferential, and Fig. 5 shows a built-up shunt 12b the lower contact portion of which is cut into a plurality of resilient fingers running parallel to the direction of flux flow therethrough, so as to make it somewhat flexible without impairing its flux-carrying capacity. Such a shunt, when held firmly against a test piece with a rough surface, will accommodate itself to such surface and make good magnetic contact. Such different forms of shunts are interchangeable on the test head spool, since they are held in place by removable screws 17 or in any other suitable manner. Different shunts may require different calibrations of the apparatus.

A description of the testing procedure will be helpful to an understanding of the invention. Referring to Fig. 1, with the switch 3 open the instrument 14 produces no indication because the pointer is biased to the left of the zero end of the scale. For the measurement of unidirectional fluxes switch 3 is now closed and it is generally desirable to close this switch, say, 10 minutes before the device is to be used, so that the circuit resistance will assume approximately a constant temperature and remain unchanged after calibration. With power on if the test head 9 is removed from any test piece such as shown at 18, the bridge circuit resistances may be such that the bridge is unbalanced and an instrument indication such as 1, on the lower scale in Fig. 2, is obtained. The value of the indication at this time has no significance. The test head 9 is now placed in contact with the test piece 18 as shown in Fig. 1 but it be assumed that the test piece 18 is not magnetized. In placing the test head on the test piece, the shunt 12 is positioned flat against the test piece as represented in Fig. 3. Placing the test head on the test piece reduces the inductance of the test head arm because now some of its alternating flux can pass through the test piece between the points of contact of the shunt thereon, and the instrument pointer returns toward the zero end of the scale but not necessarily to the zero point. However, the pointer is now adjusted to exactly the zero point of the scale by adjustment of the resistance at 7a. The switch at 16 may be opened or closed. If the test piece 18 is to be tested for surface cracks, the switches at 16 should be open. If the test is to be made for subsurface blowholes, the lower switch 16 will be closed. The adjustment of resistance 7a to place the pointer on zero will generally be different, depending upon whether switch 16 is open or closed.

We are now ready to test piece 18 for the correct amount of unidirectional magnetization. The piece 18 is represented as a crankshaft and the portion about the opening at 19 is being tested. This portion is magnetized by a direct current from a source 20 by passing current through a few turns of cable passed through opening 19. This produces a unidirectional flux which circulates in piece 18 about the opening 19. The test head 9 is oriented so that its axis is parallel to the unidirectional flux in piece 18. Such orientation may be ascertained by turning head 9 while in contact until the maximum reading of instrument 14 is obtained. The current from source 20 is now varied until the instrument 14 reads a predetermined amount, which amount has been ascertained by previous tests and corresponds to the optional unidirection flux density in test piece 18 for good test results. The test head 9 may now be removed, and magnetic powdered material is now deposited over the surface of piece 18 about opening 19 to test the same for defects.

Assume in the above procedure that the switch 16 was open for a surface crack test and it is now desired to test for subsurface defects. Switch 16 is closed and the instrument 14 recalibrated to a zero indication with the test piece 18 demagnetized. After such adjustment the piece 18 is again magnetized from source 20 and the magnetization increased until another predetermined instrument reading is obtained. The amount of flux in test piece 18 should be greater for subsurface tests than for surface tests. When testing the outer peripheral surface of the end of crankshaft 18, the test head 9 should be moved thereto, since the flux will not necessarily be uniform about opening 19 in piece 18 for a given amount of magnetization. Also, the indication given by the instrument using the shape of shunt shown in Fig. 1 is not reliable when the gauge head is brought to closer than about ¼ inch from a thin or sharp corner edge of the test piece 18. The calibration or adjustment of resistance 7a will not necessarily be the same, for surface crack tests, for example, when the gauge head is on the flat surface shown as it is when on the rounded outer peripheral surface, due to differences in the roughness of the surface and the difference in the magnetic contact between shunt 12 and such surface. However, both tests are reliable and approximately accurate, since the difference in the two conditions is properly taken care of by the different initial calibration adjustments of resistance 7a. With a little practice to become acquainted with the behavior of the apparatus under different conditions, very satisfactory results can be obtained.

As an indication of what happens in the test circuit due to the presence of unidirectional magnetization in a test piece, refer to Fig. 3. The unidirectional flux in the test piece is represented by dotted line arrows all pointing to the right. Some of this flux passes through the shunt 12. The alternating flux from the gauge head is represented by dotted line arrowheads and, of course, some of it passes through the shunt in opposite directions alternately. The two fluxes mix in the shunt and perhaps also in the adjacent test piece 18. When the two fluxes are in the same direction, the flux density in shunt 12 is appreciably greater than when the two fluxes are in the opposite direction. Hence, the A.-C. inductance of the gauge head branch of the bridge circuit is increased during one half-cycle and reduced during the reverse half-cycle in comparison to the constant A.-C. inductance of branch 8 of the bridge circuit. Both forms of unbalance send current through the rectifier instrument in the same direction because the bridge unbalance reverses with the alternating current supply. The amount of the bridge unbalance is determined by the unidirectional flux density in the test piece and by the adjustment of resistance 7a, and the proportion of the resulting direct current which flows through the instrument is determined by the position of switch 16.

It has been ascertained by numerous tests and experiments that the unidirectional flux density for the test piece for surface tests should be of the order of 15 oersteds to obtain best results for most materials. This may vary somewhat with different materials and the shapes and sizes thereof, and also with the kind of magnetic powder used and the technique of distributing it upon the surface to be tested. In any case the optimum flux value may be ascertained from experiments and the flux value measured by the instrument described, and thereafter the instrument will serve quickly to obtain such flux value and to serve as a standard of comparison for subsequent tests.

We have found it convenient to provide an instrument calibration and scale such that the lower scale of the instrument used for surface tests has a scale range from 0 to 30 oersteds and the upper scale from 0 to 60 oersteds.

For the reactance arms previously described I have used resistances in Fig. 1 as follows: Resistance 6 about 23 ohms; resistance 7 about 35 ohms; resistance 15 about 19 ohms; resistance 7a, 500 ohms with an adjustable 400-ohm section. Copper oxide rectifiers were used and a 40-ohm milliammeter instrument was employed. In the initial calibration it is preferable to have all of the resistances adjustable and adjust as needed, as the exact values of resistances will vary with different rectifier instruments, etc. The above circuit constants are for 60-cycle A.-C. voltage with a secondary transformer of approximately 6 volts. The circuits are designed for continuous operation without injury. The total power consumption is less than 20 watts. The accuracy is not influenced by ordinary variations in the supply voltage.

The above-described procedure of using the apparatus is for tests made on articles magnetized with a unidirectional flux. In general, testing with a unidirectional flux is to be preferred, since the maximum flux density needs to be only about one-half that required for alternating flux magnetization to obtain best results, and if the instrument is to be used only for unidirectional flux tests the shunt 15a and switch 16a, Fig. 1, may be omitted. However, where direct current or permanent magnets are not available or inconvenient to use, an alternating flux magnetization may be used in the test piece 18, Fig. 1. The same apparatus may be used to gauge or measure the alternating flux in a body under test. For such use the bridge circuit is not excited by alternating current through the transformer at 2 and the switch 3 is left open, or the primary or secondary circuit of the transformer is otherwise left disconnected. The gauge head is placed on the piece 18 to be examined in the same way as before, with the axis of the head parallel to the direction of flux flow. The bridge circuit is now energized by alternating current from the gauge head 9 by reason of the alternating current which is induced in its coil 11 by the alternating flux from the test piece 18 which is shunted through the core of such gauge head. This produces an A.-C. voltage across the corresponding bridge arm and causes a proportionate rectified current through, and indication of, the instrument 14. The gauge head 9 is oriented to obtain the maximum indication for a given magnetizing flux in piece 18. A different calibrating resistance 15a of the proper value is connected across the instrument 14 and a predetermined fixed setting of rheostat 7a is used. The calibration and predetermined instrument reading or readings are of course determined by experiment so as to correspond to the desired alternating magnetizations of the test piece 18. Here again different materials or shapes of materials may require different degrees of alternating flux magnetization for best results. In case of alternating flux magnetization the source 20 represented in Fig. 1 will be a suitable alternating current source.

In accordance with the provisions of the Patent Statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Apparatus for gauging the strength of unidirectional flux fields in magnetic material comprising a gauge head having a magnetic core, a coil thereon energized by alternating current to produce an alternating flux between the ends of such core, and a shunt of high permeability magnetic material extending between the ends of said core outside the coil thereon, said shunt being shaped and dimensioned so that when placed upon the surface of a magnetic body carrying a unidirectional flux it will divert a portion of such unidirectional flux through the same path in said shunt traversed by alternating flux between the ends of the core, said unidirectional flux in the shunt producing changes in the effective alternating reactance of said coil in proportion to the strength of the unidirectional flux field in such magnetic body, and calibrated means including a rectifier measuring instrument associated with the energizing circuit of said coil and responsive to such changes in reactance for indicating the strength of the unidirectional field in such magnetic body.

2. Apparatus for gauging the strength of unidirectional flux fields in magnetic material comprising a gauge head having a magnetic core, a coil thereon energized by alternating current to produce an alternating flux between the ends of the core and a magnetic shunt extending between the ends of the core outside the coil thereon, said shunt being shaped and dimensioned so that when placed upon the surface of a magnetic body carrying a unidirectional flux said shunt forms the same path for a portion of such unidirectional flux and a portion of the alternating flux between the ends of the core, whereby the effective alternating current reactance of said coil changes in value with opposite half-cycles of the alternating current excitation of said coil in proportion to the strength of the unidirectional field in such magnetic body, and calibrated means associated with the energizing circuit of said coil and responsive to such half-cycle changes in reactance for indicating the strength of the unidirectional field in such magnetic body.

3. Apparatus for gauging the strength of unidirectional flux fields in magnetic material comprising an alternating current bridge circuit having a pair of reactance coil arms and a pair of resistance arms, a rectifier instrument for measuring the unbalance of said bridge, one of said resistance arms being adjustable for calibration purposes and one of said reactance arms comprising a gauge head having a magnetic core, a coil on said core comprising one of the reactance coil arms of the bridge circuit, and a high permeability magnetic shunt connected between the ends of said core outside the coil thereon, said shunt being shaped so that when placed in contact with the surface of a magnetic body carrying unidirectional flux it diverts a portion of such flux through the shunt in the same path through said shunt which is traversed by alternating flux between the ends of the core, said shunt being dimensioned so that such fluxes produce variations in the effective reactance of said coil due to changes in the saturable condition of said shunt, said bridge and instrument being calibrated to produce an indication of said instrument indicative of the strength of the unidirectional flux field in such magnetic body.

4. In apparatus for measuring the strength of magnetic fields in magnetic bodies, a gauge head adapted to be moved about upon the surface of such body comprising a spool-shaped magnetic core having an alternating current excitation coil thereon, a U-shaped magnetic shunt of high permeability material extending between the ends of the core outside the coil and pivoted to the center ends of the core so that it may be rotated about the core to different positions, a handle for said gauge head enclosing leads to said coil, the portion of said shunt which lies outside the coil between the ends of the core having an inwardly arched shape to facilitate placing it in magnetic shunting relation in contact with a surface under test.

5. Apparatus for gauging the strength of unidirectional and alternating magnetic fields in magnetic materials, comprising a gauge head having a magnetic core, a coil thereon, a shunt of high permeability extending between the ends of said core outside the coil thereon, said shunt being shaped and dimensioned so that when placed upon the surface of a magnetized magnetic body under test it diverts flux therefrom, a measuring circuit and instrument associated with said coil for producing a measurement of the alternating flux strength in the body under test by reason of alternating current induced in said coil by such flux when said body is magnetized by alternating flux, means for otherwise energizing said circuit, instrument and coil by alternating current to obtain a measurement of the flux strength in the body under test when the latter is magnetized by unidirectional flux and is thereby influencing the condition of saturation of said shunt and consequently the flow of alternating current in said coil, and means for calibrating said instrument for both of such tests.

JAMES A. SAMS.

REFERENCES CITED

The following references are of record in the file of this patent:

UNITED STATES PATENTS

| Number | Name | Date |
|---|---|---|
| 2,252,059 | Barth | Aug. 12, 1941 |
| 2,398,488 | Zuschlag | Apr. 16, 1946 |

FOREIGN PATENTS

| Number | Country | Date |
|---|---|---|
| 524,726 | France | Sept. 9, 1921 |
| 774,147 | France | Nov. 30, 1934 |

OTHER REFERENCES

Rusher, General Electric Review, Nov. 1939, pp. 486–487.

Certificate of Correction

December 16, 1947.

Patent No. 2,432,811.

JAMES A. SAMS

It is hereby certified that error appears in the printed specification of the above numbered patent requiring correction as follows: Column 2, line 12, for the word "issued" read *used*; and that the said Letters Patent should be read with this correction therein that the same may conform to the record of the case in the Patent Office.

Signed and sealed this 25th day of May, A. D. 1948.

[SEAL]

THOMAS F. MURPHY,
*Assistant Commissioner of Patents.*